Nov. 24, 1964 N. REINHARDT 3,158,508
APPARATUS FOR PRODUCING GLAZING COATINGS
Filed July 3, 1962 4 Sheets-Sheet 1
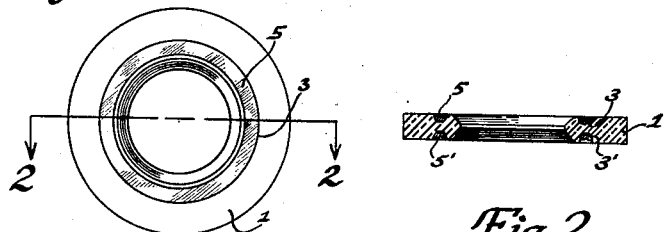
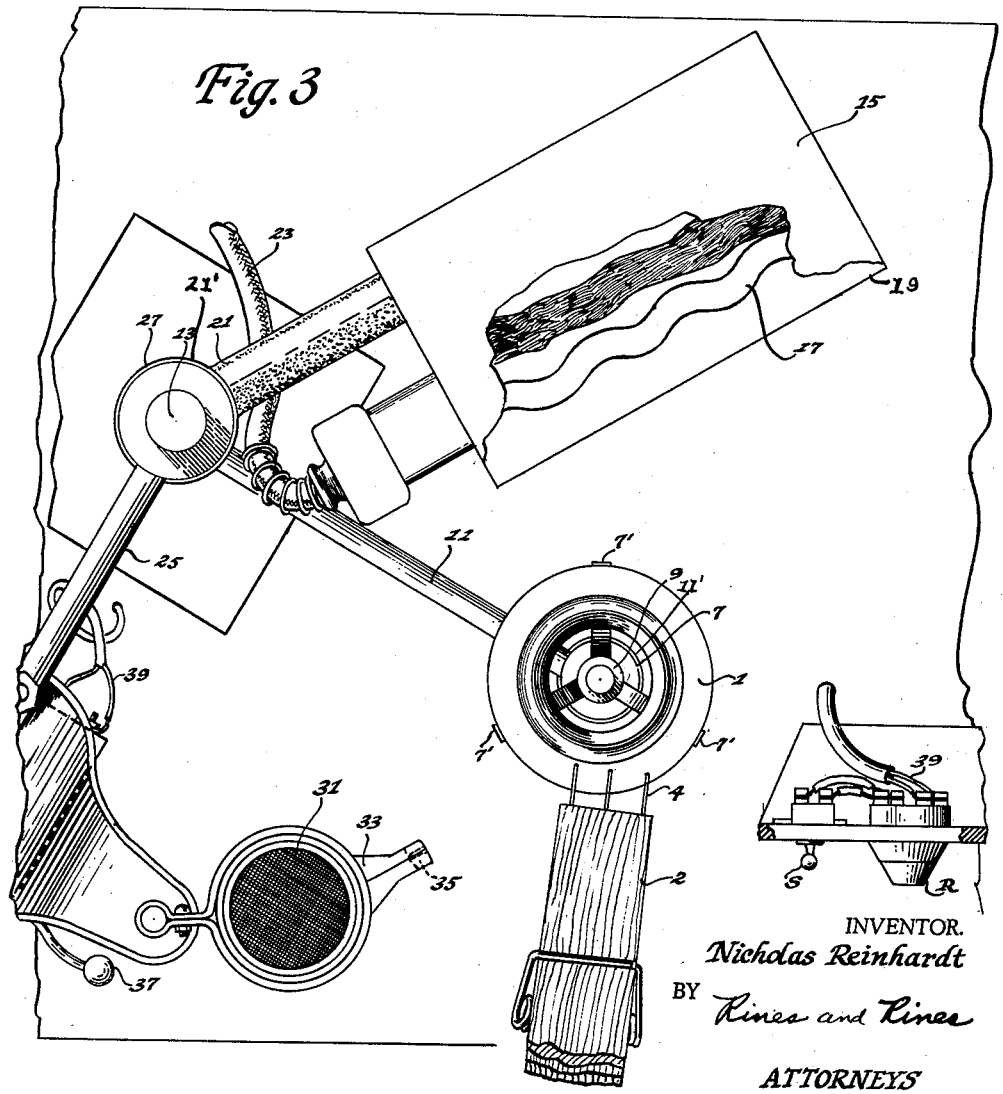
INVENTOR.
Nicholas Reinhardt
BY Rines and Rines
ATTORNEYS Nov. 24, 1964 N. REINHARDT 3,158,508
APPARATUS FOR PRODUCING GLAZING COATINGS
Filed July 3, 1962 4 Sheets-Sheet 2

INVENTOR.
Nicholas Reinhardt
BY
Rines and Rines
ATTORNEYS

Nov. 24, 1964  N. REINHARDT  3,158,508
APPARATUS FOR PRODUCING GLAZING COATINGS
Filed July 3, 1962  4 Sheets-Sheet 4

INVENTOR.
Nicholas Reinhardt
BY
Rines and Rines
ATTORNEYS

United States Patent Office 3,158,508
Patented Nov. 24, 1964

3,158,508
APPARATUS FOR PRODUCING GLAZING COATINGS
Nicholas Reinhardt, Cambridge, Mass., assignor to Edgerton, Germeshausen & Grier, Inc., Boston, Mass., a corporation of Massachusetts
Filed July 3, 1962, Ser. No. 208,667
1 Claim. (Cl. 118—64)

The present invention relates to methods of producing glazing coatings and, more particularly, for producing coatings of solder glass and similar materials upon metal, glass or similar parts.

This application is a continuation-in-part of my copending application Serial 742,848, filed June 18, 1958.

Among the more successful prior-art processes for appling solder glass or similar coatings to metal or glass parts, for such purposes as enabling subsequent sealing to other metal parts, are involved the dipping of the hot parts in molten solder glass, or the melting of a mixture of powdered glass in a binder which is thereupon applied to the cold metal parts as a paste. Not only are these processes disadvantageous in lack of uniformity, but they have other drawbacks, as well. Solder glass, for example, is inherently unstable and is difficult to hold in the molten state for any length of time, the glass having a tendency to devitrify. The technique of attempting to coat by dipping the hot parts in molten solder glass, therefore, not only produces nonuniform results, but often renders unfeasible the attainment of bubble-free layers of solder-glass. In addition, the dipping process does not lend itself, either, to the deposition of solder glass only upon selected parts or to providing symmetrical coatings. As for the paste process, before-mentioned, an extra step involving subsequent baking is required in order to drive off the gases evolved from the binder used in the paste. In addition, a slow and uneven wetting is inherent in the paste process, which also gives rise to filling the mass of molten glass with clouds of small bubbles that tend to weaken the coating.

An object of the present invention, accordingly, is to provide a new and improved method of providing solder-glass or similar glazing coatings upon glass or metal parts, which shall not be subject to the above-mentioned disadvantages; but that, to the contrary, shall achieve the superior results of the hot-dipping processes while allowing the precise control of the location and quantity of solder glass attainable with the paste process.

Another object is to provide a new and improved method of the character described that has the advantage of requiring a sufficiently short time for effecting the glazing or coating that the sub-layers have no opportunity to sag. If the more unstable glasses are employed, moreover, there is insufficient time in which to permit such glasses to devitrify, thus rendering the process remarkably suitable for pre-glazing parts with devitrifiable frits, or for making vitreous seals or other structures of glasses that are too unstable to remain vitreous during the longer heating cycles required to melt them in any appreciable thickness, in accordance with prior-art techniques.

In summary, the present invention enables the production of a smooth, substantially bubble-free layer of solder glass or other coating material, that may be melted directly upon a surface of metal or glass parts by first heating the surface of the part-to-be-coated with direct radiation until it assumes a temperature at which a particle of the coating glass of predetermined size will substantially instantaneously melt upon contact with said surface, when the particles are applied at a predetermined rate. These particles are sifted and permitted to become deposited upon successively differently positioned regions of the surface in substantially particle-thin strata. Repetitive deposition of this nature results in any desired thickness being obtained by the build-up of successive molten strata, each stratum melting into the one preceding it, to form a dense, continuous mass bound fast to the substrate.

Other and further objects will be explained hereinafter and will be more particularly pointed out in the appended claim.

The invention will now be described in connection with the accompanying drawing, FIGURE 1 of which is a top elevation of an illustrative article that can be formed in accordance with the present invention;

FIGURE 2 is a transverse section taken upon the line 2—2 of FIGURE 1, looking in the direction of the arrows;

FIGURE 3 is a top elevation of a preferred apparatus for carrying out the method underlying the present invention;

For purposes of illustration, a glass or similar insulator ring 1, useful in an electronic spark gap or similar discharge apparatus, and adapted to be coated in accordance with the present invention, is shown in FIGURES 1 and 2. It is to be understood, however, that the present invention is more generally useful, also, and that this illustration is but an example. The insulator ring 1 may be formed of Corning Type 9010 silicate glass, for instance, which is to be joined at its upper and lower surfaces to metal electrode devices, not shown. This junction is effected by providing the insulator ring 1 with a substantially circular groove 3 in its upper surface and a similarly oppositely disposed groove 3' in its lower surface. The grooves 3 and 3' are to receive the solder-sealing glass, such as, for example, Corning Type 7570, a solder glass of the type described in United States Letters Patent No. 2,643,020, issued on June 23, 1953, to Robert H. Dalton, hereinafter generically referred to as solder glass. Ring-like coatings or glazing regions 5 and 5' are thus ultimately to be provided within the respective grooves 3 and 3' for this purpose.

Figure 4:
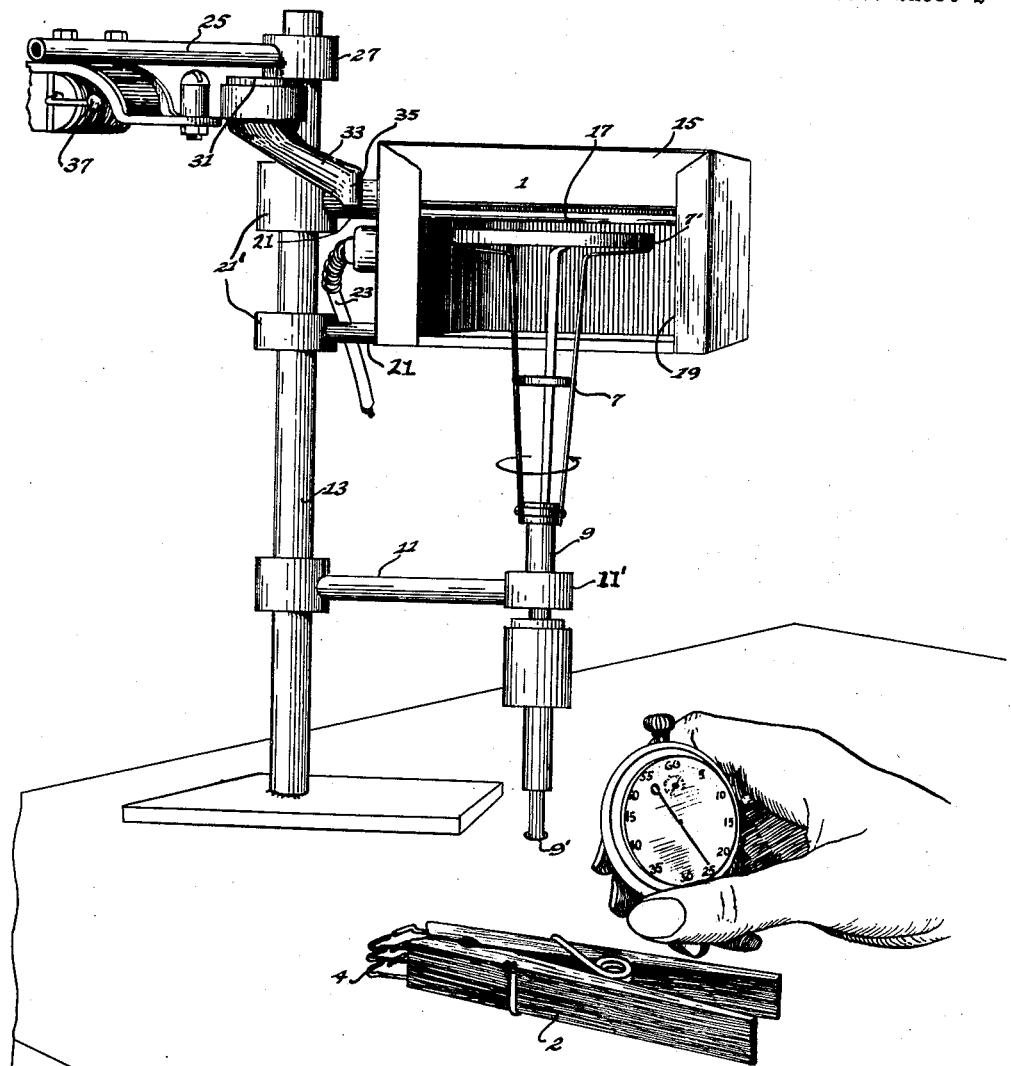
FIGURE 4 is a perspective view of the same apparatus, taken from the side, and illustrating a subsequent step in the process of the invention.

An illustrative apparatus for carrying out the novel method of the present invention is shown in FIGURE 3, comprising a self-centering chuck, the arms 7 of which receive and hold the ring 1 at spaced regions 7' about its periphery. The chuck is carried by a rotatable spindle 9 that, as is more particularly shown in FIGURE 4, passes through a collar 11' and an aperture 9' in the apparatus table, in order to be rotated by a motor positioned therebelow, not shown, for a purpose later described. The collar 11' is carried by an arm 11 extending from a standard 13, and angularly pivotable thereabout. An oven 15 containing one or more heating coils 17 and having a side opening 19, is also angularly adjustable about the standard 13 by means of mounting arms 21 and associated collars 21'. The oven 15 may be rotated clockwise about the standard 13 in order to receive the ring 1 held in the chuck 7, FIGURES 4 and 5, or it may be rotated counterclockwise to remove the oven therefrom, FIGURES 3 and 7. Electrical current for the heater coils 17 may be supplied by the electrical cable 23, in a well known manner.

Rotatably supported therebelow, by means of an arm 25 extending from a rotatable collar or bearing 27 upon the standard 13, is a sifting mechanism for solder-glass or similar particles comprising a strainer cup 31, a cooperating inclinedly depending chute 33, and an electro-magnetic bell-type vibrator-current circuit control, schematically illustrated by the conductors 39, to control the amplitude of vibration of the vibrator 37, and hence the degree of sifting action of the sifter mechanism 31.

In operation, a clip tool 2, having cooperating tong jaws 4, may be employed for placing the ring 1 in the chuck 7 as is illustrated in FIGURE 3. The oven 15 is then rotated clockwise over the ring 1, FIGURE 4, in order to heat the ring. The oven 15 is adjusted to a position such that the groove 3 in the ring 1 is located just outside the side opening 19 in the oven 15. Even heating is insured by rotation of the shaft 9 at, for example, 200 to 400 revolutions per minute. The temperature of heating is adjusted, in well-known manner, as by varying the current applied by conductors 23 to the heater coils 17, to a particular rather critical value; namely, to a value that will permit the upper surface of the ring 1 to assume a temperature at which a plurality of particles of the coating material of predetermined size will substantially instantaneously melt upon contact with said surface, when the particles are applied at a predetermined rate. With a 325-mesh sifting screen 31, for example, the before-mentioned Corning 7570-Type solder-glass particles, the particle size is maintained sufficiently small to enable such melting, if the upper surface of the ring 1 is elevated to a temperature of about 550 degrees, centigrade. In mass-production operation, this heating process will take a predetermined length of time which can be determined by the operator by means of a stop watch, FIGURE 4.

Figure 5:
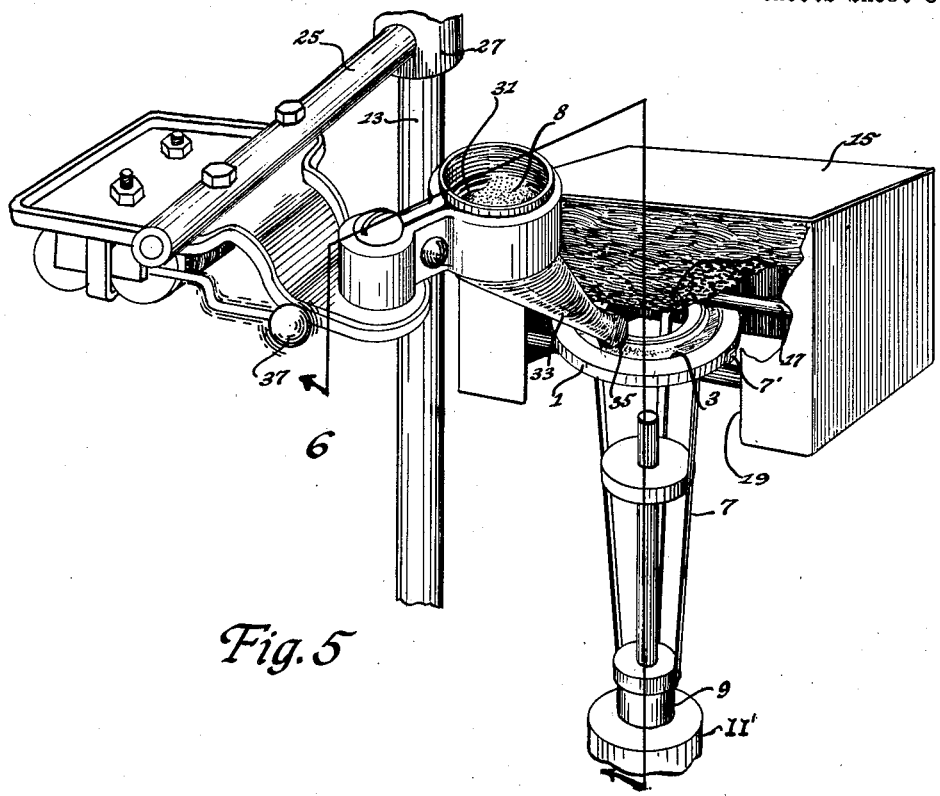
FIGURE 5 is a view similar to FIGURE 4 of a later step.
Figure 6:
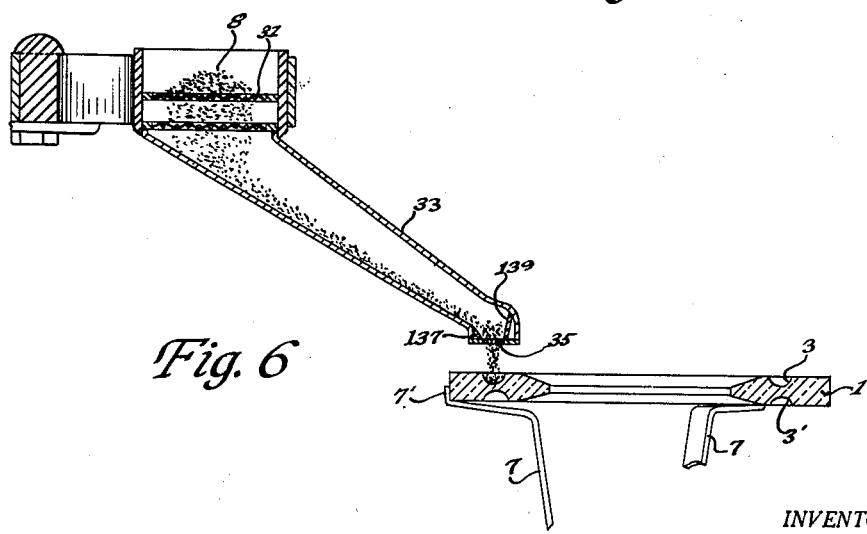
FIGURE 6 is a longitudinal section taken upon the line 6—6 of FIGURE 5, looking in the direction of the arrows.

When the ring 1 is at the desired temperature, accordingly, the sifter 31 and its chute 33 are pivoted counterclockwise to the position shown in FIGURE 5, with the mouth 35 of the chute 33 positioned at a predetermined location adjacent the side opening 19 of the oven 15 at which the groove 3 of the rotating ring 1 is exposed outside the opening 19. Powdered solder-glass, or other similar material 8, FIGURES 5 and 6, is disposed within the sifter 31. Operation of the switch S, FIGURE 3, will cause the current to flow in the conductors 39 in order to operate the vibrator 37 and to cause vibration of the sifter 31, as schematically indicated in FIGURE 5. This will permit solder-glass particles, of controlled size no greater than the predetermined limit of the mesh, to travel down the chute 33, out the mouth 35 and into the successive portions of the groove 3 of the ring 1 that are successively presented to the mouth 35 in response to rotation of the ring 1 about the spindle 9. Since, as before stated, the upper surface of the ring 1 is at the temperature where the discrete particles of solder-glass material will substantially instantaneously melt upon contacting the ring, it is then necessary to insure that, for the predetermined rotational rate of the ring 1, the rate of delivery of the particles to the groove 3 of the upper surface of the ring 1 is effected within limits such that each successive particle substantially instantaneously melts upon contacting the groove 3 of the upper surface of the ring 1. This rate may be controlled by varying a rheostat R, FIGURE 3, in the circuit of conductors 39, thus to vary the degree or amplitude of vibration of the vibrator 37, and hence the rate of delivery of the powdered material to the groove 3. In FIGURE 6, this delivery is illustrated in more detail. Preferably, baffle plates 137 and 139 are employed near the mouth 35 of the chute 33, the forward baffle plate 139 causing the particles to fall straight down into the ring groove 3, and the back baffle plate 137 serving to re-deflect any stray particles. Both baffles are desirably curved, not shown, to follow the curvature of the ring groove 3, so that discharge mouth 35 is actually a slot instead of just a hole.

The particles 8 are forced to fall into the rotating groove 3 with a high degree of precision, and the successively deposited particles are thus enabled to melt substantially instantaneously upon contact with the hot floor and sides of the successive portions of the groove 3, thereby to form a molten solder-glass stratum thereupon. As the ring 1 is further rotated repetitively to bring the successive portions thereof past the predetermined location of the chute mouth 35, the successive portions of the first stratum of molten glass are progressively fed with further particles to form successive strata of molten solder-glass, each merged fast with the molten substrata preceding it. In this manner, no bubbles are produced and, in a very short period of time, controlled deposition of the molten mass 5 in the desired location 3 has been achieved. The present machine, moreover, requires less operating personnel than prior-art apparatus, and has similarly eliminated many hours of furnace time that are usually required with prior-art hand-pasting operations.

Figure 7:
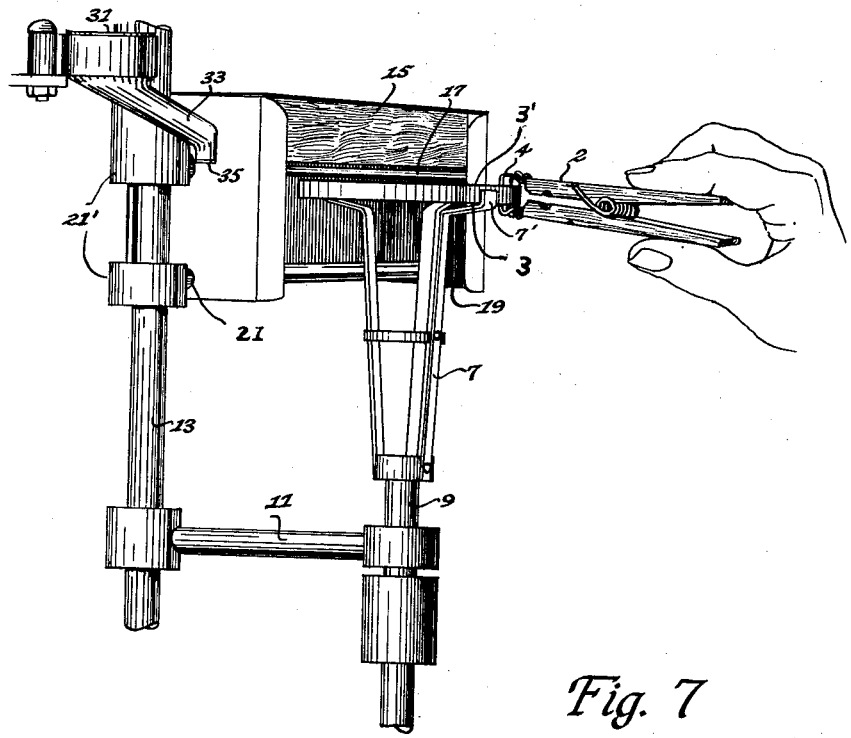
FIGURE 7 is a view similar to FIGURE 4 of still a further step.
Figure 8:
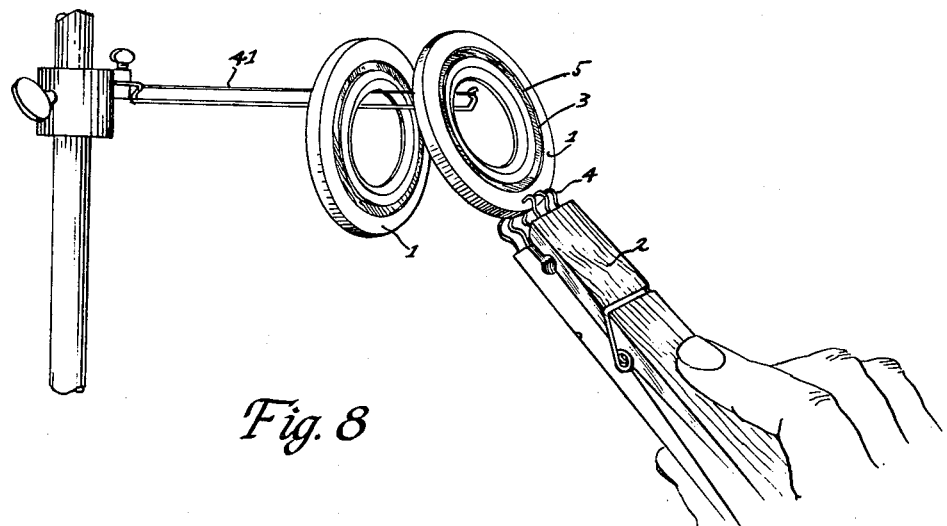
FIGURE 8 is a perspective view of the final cooling operation.

The oven 15 may then be withdrawn, as shown in FIGURE 7, and the ring 1 may be inverted to permit the glazing of the opposite groove 3' on the opposite surface of the ring 1. After this has been effected, the oven is again removed and the ring is placed upon a fine-wire cooling rack 41, FIGURE 8, until it is cool enough to place in an ordinary packing box.

It will be evident that the above process and apparatus is not limited to glass and may be used with other glazes, organic materials, plastics and the like, where the results of the present invention are required. The solder-glass operation described, moreover, may be used not only for the before-mentioned spark gaps, but for other low-temperature glass-to-metal seals, including those required in flash tubes; for glass-to-glass seals, and graded seals; for television-tube face plate seals; for the windows in magnetrons; and in other apparatus, as well.

Further modifications will occur to those skilled in the art and all such are considered to fall within the spirit and scope of the invention as defined in the appended claim.

What is claimed is:

Apparatus for applying a hot molten annulus of substanially bubble-free material of uniform thickness to a planar surface of an article that comprises:

a base;

a self-centering chuck rotatingly mounted from said base and adapted to hold said article with said planar surface horizontal and directed upward;

electric motor means rotatingly mounted on said base rotatingly connected to said chuck to rotate, when energized, said chuck and said article around an axis perpendicular to said planar surface at a predetermined rate;

a standard affixed to said base and displaced from said chuck and motor;

an electric oven extending from said standard and having a side opening, said oven being adapted to be moved from a rest position to a position enclosing said rotating chuck and article, and when energized to heat said article in cooperation with the rotation thereof to a uniform temperature at which each particle of the coating material of predetermined size will substantially instantaneously melt upon contacting said heated planar surface of said article when applied at a predetermined rate, and to maintain said temperature while said particles are being applied; and particle application means extending from said standard and adapted to be moved from a rest position to a position adjacent said side opening in said oven while said rotating planar surface is being maintained at said temperature, comprising an inclined chute having a mouth located at a predetermined point above said rotating planar surface of said article when said article application means is moved to said position, a strainer cup mounted at the entrance to said chute and having a sifting screen and adapted when vibrated to supply particles of coating material of said predetermined size to said chute and by gravity therethrough and through said mouth at said predetermined point upon said heated rotating planar surface to form a hot molten annulus of coating material of uniform thickness thereupon, and an electric vibrator connected to said strainer cup and adapted when energized to vibrate said cup causing said coating material of predetermined size to fall through said sifting screen.

References Cited by the Examiner

UNITED STATES PATENTS

| | | | |
|---|---|---|---|
| 452,150 | 5/91 | Wetherbee | 118—308 |
| 1,281,762 | 10/18 | Carpenter | 118—503 |
| 1,589,711 | 6/26 | Martinez | 118—503 |
| 1,869,163 | 7/32 | Niedergesass | 117—23 |
| 2,513,434 | 7/50 | Tinsley | 118—308 |
| 3,031,338 | 4/62 | Bourdeau | 117—107.2 |

FOREIGN PATENTS

| | | |
|---|---|---|
| 503,649 | 12/54 | Italy. |
| 57,595 | 11/11 | Switzerland. |

RICHARD D. NEVIUS, *Primary Examiner.*